UNITED STATES PATENT OFFICE.

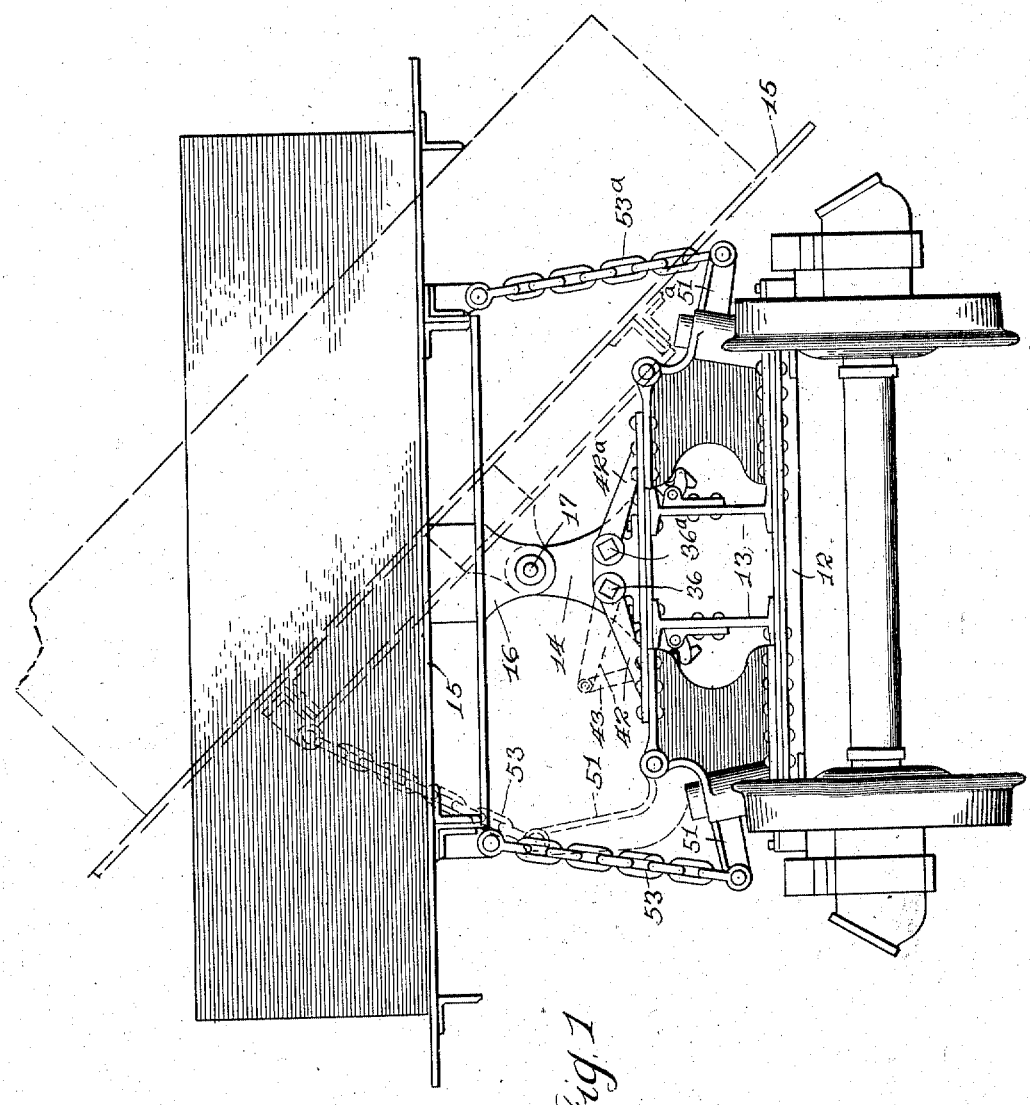

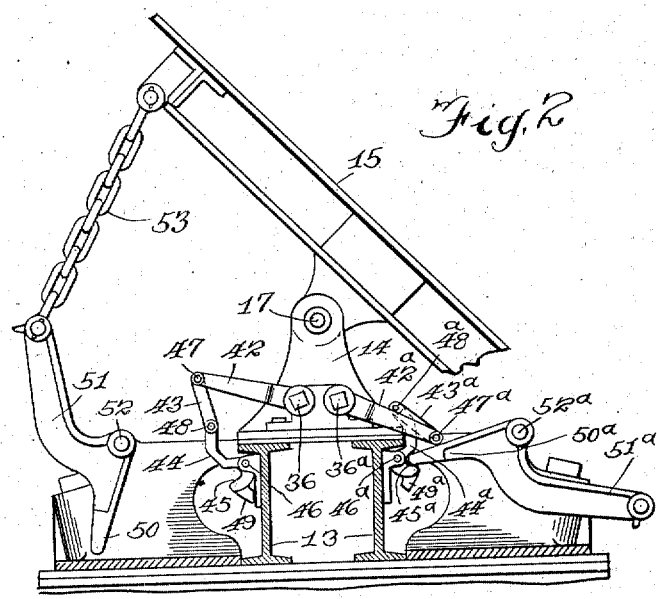
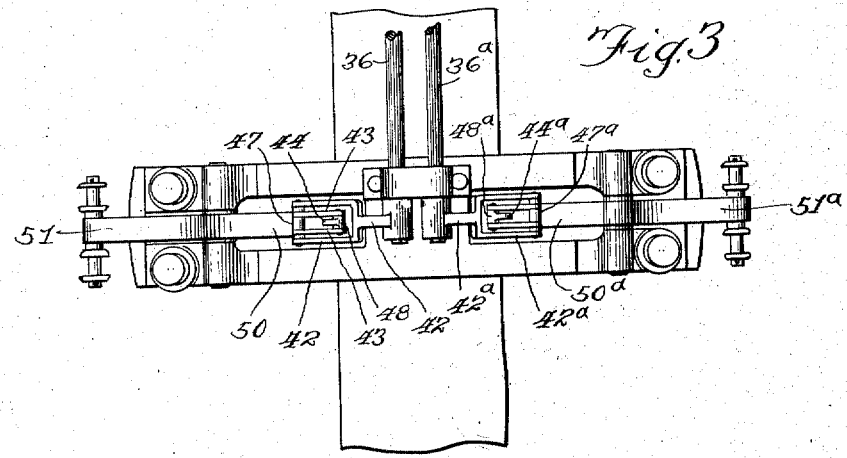

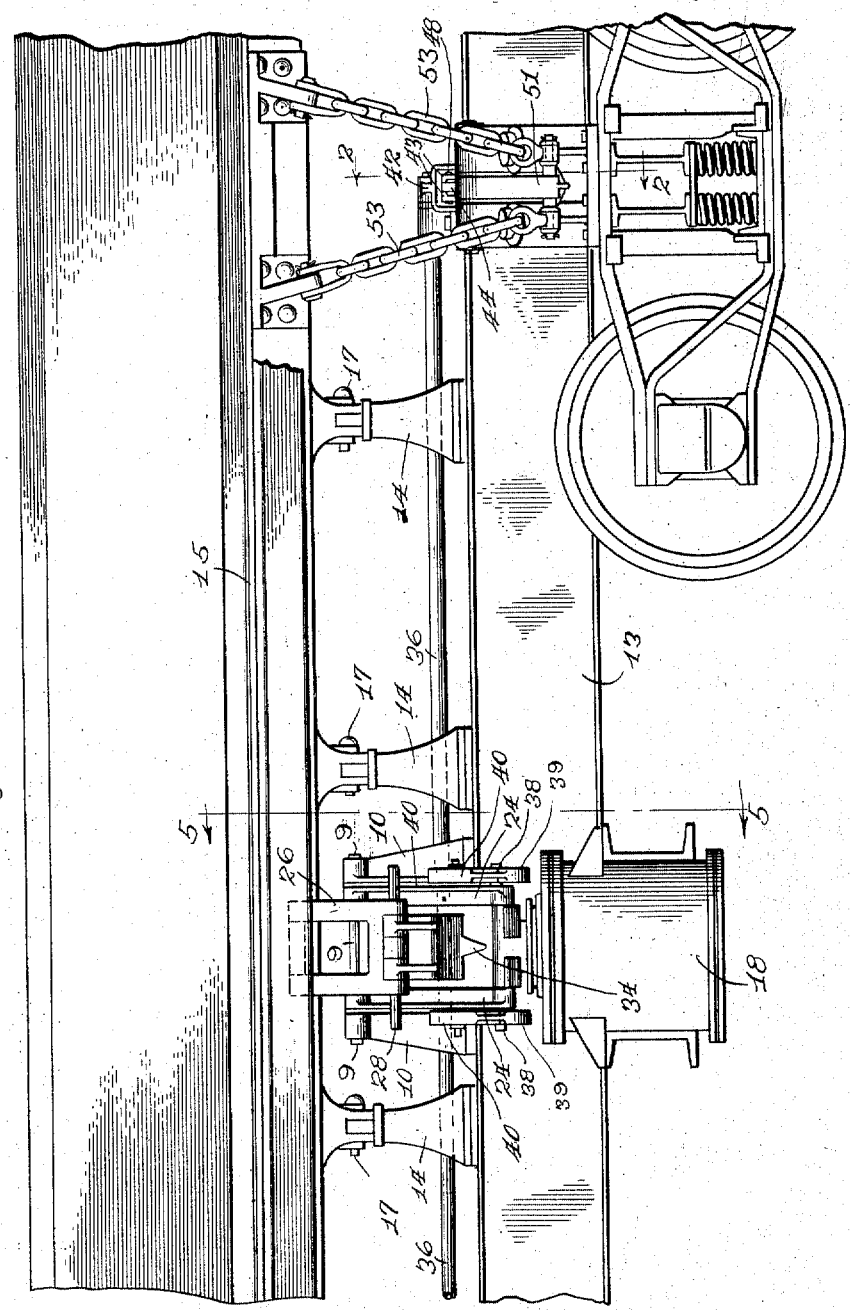

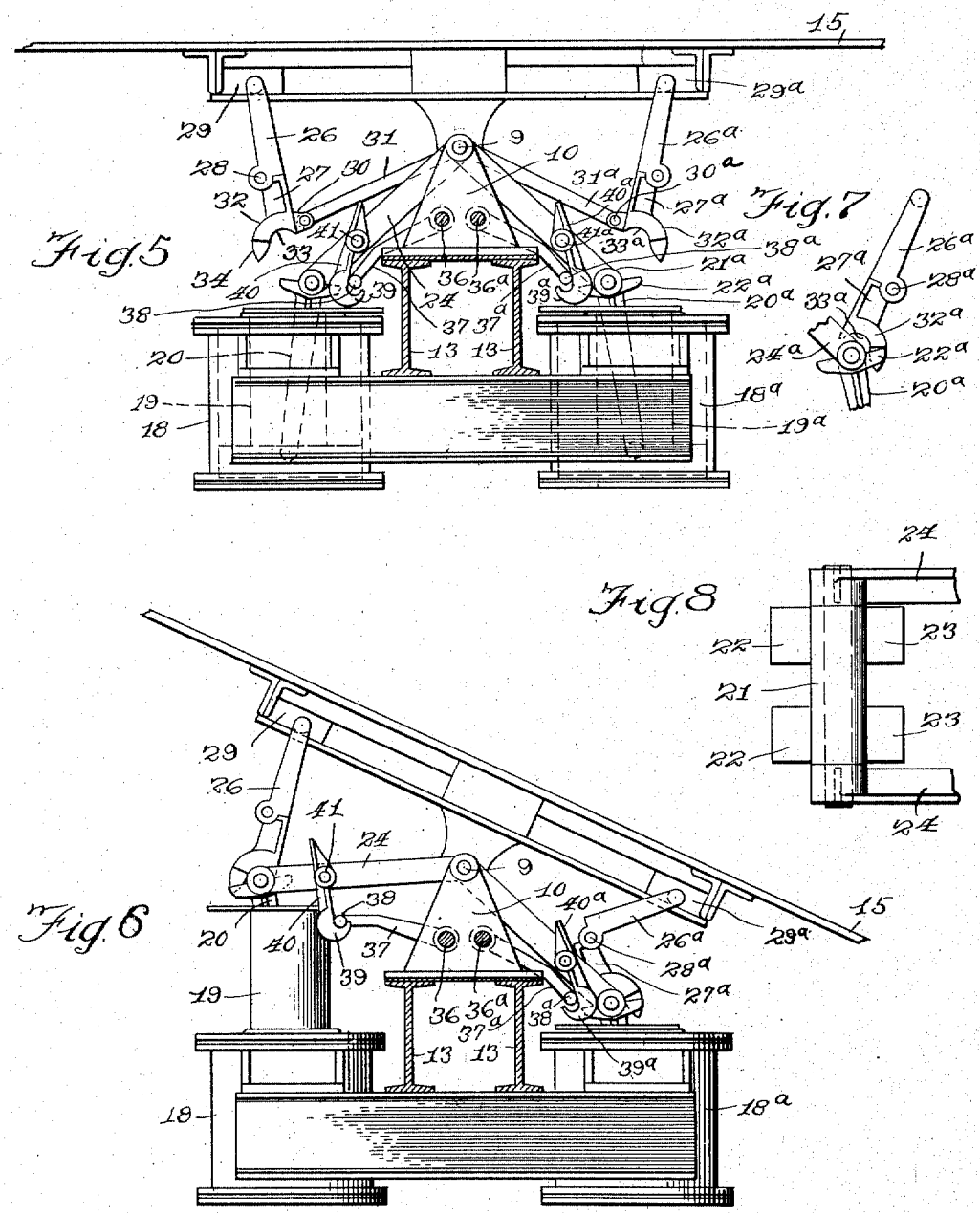

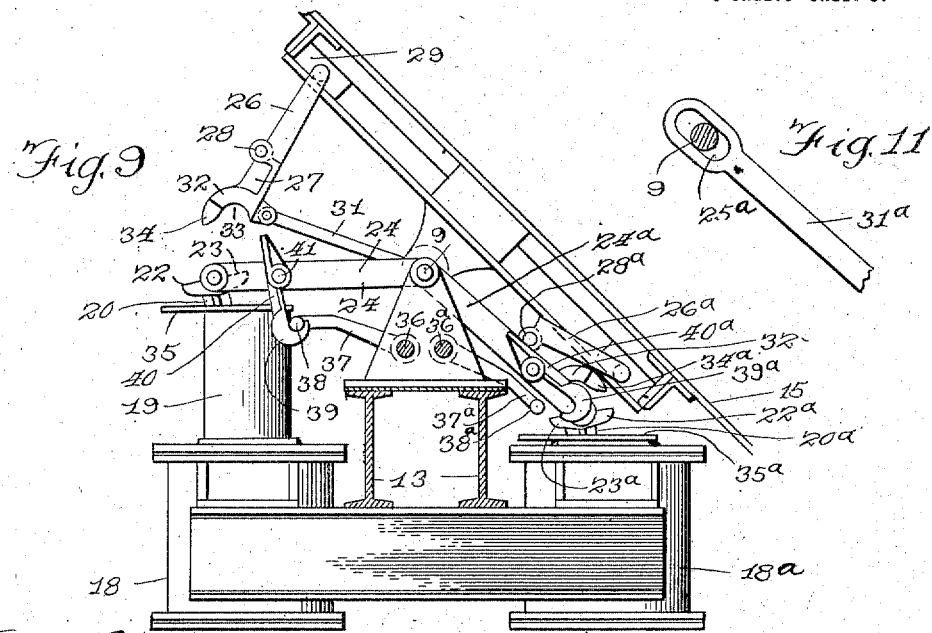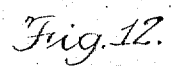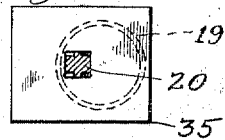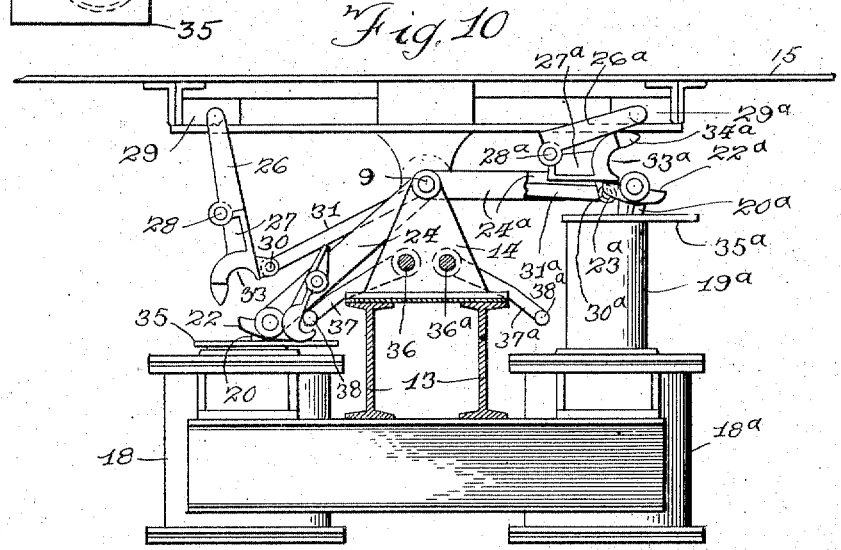

JAY BYRON RHODES, OF KALAMAZOO, MICHIGAN, ASSIGNOR TO WESTERN WHEELED SCRAPER COMPANY, OF AURORA, ILLINOIS, A CORPORATION OF ILLINOIS.

DUMP-CAR.

1,256,163.	Specification of Letters Patent.	Patented Feb. 12, 1918.

Application filed May 19, 1916. Serial No. 98,495.

*To all whom it may concern:*

Be it known that I, JAY B. RHODES, a citizen of the United States, and a resident of Kalamazoo, in the county of Kalamazoo and State of Michigan, have invented certain new and useful Improvements in Dump-Cars, of which the following is a specification, reference being had to the accompanying drawings.

My invention relates to power-operated dump-cars in which the car bed is arranged to be tilted to discharge its load at either side of the truck, the tilting of the bed in one direction or the other being effected by vertically-movable plungers mounted in cylinders at the opposite sides of the car, the cylinders being connected with some suitable source of supply of compressed air. In such cars it is necessary to provide devices connected with opposite sides of the car bed for holding the bed in its normal or horizontal position while receiving and transporting the load, and means must be provided for releasing the locking or retaining device at the side opposite that at which the load is to be dumped so that the dumping operation may be effected. When the bed is restored to its horizontal position after dumping, provision must be made for preventing it from moving beyond such position and tilting toward the opposite side. The object of my present invention is to provide improved mechanism for locking the bed in its normal position, and for automatically releasing the locking devices at the appropriate side when the dumping mechanism is operated, without releasing the locking devices at the opposite side, so that when the car bed is restored to its normal position after dumping it will not move beyond a horizontal position. I accomplish this object as illustrated in the drawings and as hereinafter described. What I regard as new is set forth in the claims.

In the accompanying drawings,—

Figure 1 is an end elevation of a car showing my improved locking devices, the position of the parts when the car bed is tilted being shown in dotted lines;

Fig. 2 is a partial cross-section, illustrating the locking devices more in detail;

Fig. 3 is a partial plan view showing the locking devices;

Fig. 4 is a partial side elevation of one end of a car embodying my improvements;

Fig. 5 is a partial vertical cross-section on line 5—5 of Fig. 4, showing the dumping cylinders and the connections by which the several operations are effected;

Fig. 6 is a similar view showing the car bed partly tilted;

Fig. 7 is a detail illustrating the position of certain parts at a stage intermediate between the positions shown in Figs. 5 and 6;

Fig. 8 is an enlarged detail, being a partial plan view of the upper portion of the plunger-rod;

Fig. 9 is a view similar to Figs. 5 and 6, showing the position of the parts at the completion of the dumping operation;

Fig. 10 is a similar view showing the position of the parts at the completion of the operation of restoring the bed to its normal position;

Fig. 11 is a detail showing the construction of the inner end of one of the links which connect with and guide the thrust-bars, and Fig. 12 is a top detail view showing one of the plunger cover plates, the plunger rod being in section.

Referring to the drawings,—

12 indicates one of the trucks, which may be of any suitable construction,—two of such trucks being ordinarily employed, connected by longitudinal I-beams 13, forming the under-frame of the car. Said under-frame carries a series of pedestals 14 arranged at suitable intervals, upon which are mounted a car bed 15 by means of brackets 16 connected by pivots 17 with the pedestals 14. It will be understood that the construction illustrated is only one of a variety of ways in which the car may be pivotally mounted to be tilted to discharge its load at either side of the car, my invention not being limited to mounting the car bed in the particular way shown and described. As the car is what may be termed "bilaterally symmetrical," the mechanism employed at one side being duplicated at the other, the reference numerals used to indicate the parts at one side will be used to indicate the corresponding parts at the other side of the car with the addition of the exponent $a$ and it will not be necessary, therefore, to specifically describe the parts at both sides of the car.

18—18$^a$ indicate cylinders provided at opposite sides of the car, preferably at the longitudinal center thereof. These cylinders are arranged to be supplied with compressed air, or other suitable fluid, in any approved way. 19 indicates a plunger mounted in the cylinder 18 and arranged to be projected vertically when the operating fluid is admitted to the cylinder 18. The plunger 19 is a cylinder closed at its lower end, and in it is mounted a plunger-rod 20 having a bearing at the lower end of the plunger and arranged to rock transversely of the car. The plunger is provided at its upper end with a rounded cross-head 21 having outwardly-projecting lugs 22 and inwardly-projecting lugs 23, the lugs at each side of the cross-head 21 being spaced apart as shown in Fig. 8. 24 indicates a pair of links pivotally connected at their outer ends with the end portions of the cross-head 21 and pivotally connected at their inner ends with the car frame concentrically with the axis of the car bed, being mounted upon a pivot 9 carried by a bracket 10 which is secured upon the I beams 13, as shown in Fig. 4. These links operate to rock the plunger-rod 20 transversely of the car as the plunger is moved into or out of its cylinder, as illustrated in Figs. 5 and 6. 26—27 indicate two members, which together form a thrust-bar, said members being connected by a stop-hinge or knuckle joint of which 28 is the pintle or pivot. The member 26 is journaled in a suitable bearing provided in a block 29 carried at the under side of the car bed so that the said member may swing transversely. Preferably said member is in the form of a frame, as shown in Fig. 4. The member 27 is provided with a lug 30 at its lower inner margin by which it is connected with a link 31 having a slot 25 at its inner end which receives the pivot 9, as shown in Fig. 5. At its lower end the member 27 carries a head 32, in the lower surface of which is a rounded bearing or socket 33, as best shown in Fig. 5. Said head at its outer margin carries a finger 34, the inner surface of which is convex, as also shown in Fig. 5. The purpose of this arrangement will be hereinafter set forth. The joint of the thrust-bar composed of the members 26—27 is so arranged that it may break inwardly, but not outwardly. That is to say, the abutting ends of the members 26—27 may swing toward the axis of the car but cannot move outwardly beyond a position in alinement with each other. This will be apparent from an inspection of the parts in Fig. 6. The head 32 is in position to be engaged by the cross-head 21 when the latter is carried upward by the projection of its plunger, and said head is swung outward by the link 24, the socket 33 then receiving the rounded cross-head 21, as illustrated at the left in Fig. 6. When this occurs the line of direction of the force applied to the thrust-bar will fall back of the pivot 28, and consequently the joint of the thrust-bar will not break and the power of the plunger will operate to lift that side of the car, tilting it as shown in Fig. 6. This operation is not prevented by the corresponding devices at the opposite side of the car for the following reason: When the thrust-bar 26ª is carried downward by the tilting of the car toward the right, the lugs 22ª of the plunger-rod 20ª will engage the outer portion of the head 32ª, as shown in Fig. 7, and as the line of direction of the force applied to the members 26ª—27ª of the right-hand thrust-bar will then be outside the pivot 28ª, the joint will be broken and the members 26ª—27ª will fold, as shown at the right in Fig. 6. This operation will continue as the car bed tilts until the parts reach the position in Fig. 9, which illustrates the position of the car bed when tilted to the limit of its movement. At this time, as will be noted, the thrust-bar at the left-hand side of the car will have been raised so that the head 32 will be lifted out of engagement with the cross-head 21. Also it should be noted that during the tilting operation the head 32ª will rock upon the cross-head 21ª so that at the completion of the tilting operation the lower inner portion of the head 32ª will overlie the lugs 23ª, as shown in Fig. 9. To restore the car bed to its horizontal position, power is applied to the cylinder 18ª, causing its plunger 19ª to rise, whereupon the lugs 23ª will engage the lower inner surface of the head 32ª, the opposite surface of such head engaging the under side of the car bed in the manner shown in Fig. 10. As the plunger 19ª rises the car bed will accordingly be rocked in the opposite direction and restored to its horizontal position. When the plunger 19ª is withdrawn into its cylinder, the members 26ª—27ª of the thrust-bar at that side of the car will be restored by gravity to their alined position, as shown in Fig. 5. 35 indicates a cover-plate for the plunger 19, said plate having an opening for the passage of the plunger-rod 20. When the plunger-rod rocks, the plate 35 is moved from side to side upon the upper end of the plunger so that it at all times covers the upper end of said plunger and prevents dirt from falling into it when the bed is dumped as well as at other times.

In addition to performing the operations above described, the plungers 19—19ª also operate the locking mechanism by which the car bed is held in operative position and is prevented from tipping beyond such position when restored after dumping. This locking mechanism will now be described. 36 indicates a rock-shaft extending longitudinally of the car, slightly at one side of the center thereof, as shown in the drawings, said shaft being mounted in suitable bearings, preferably provided in the pedestals 14. Said rock-shaft carries two arms 37 which project laterally at opposite sides of the links 24, as shown in Fig. 9. The outer ends of such arms 37 are provided with pins 38 which are adapted to be engaged by hooks 39 provided at the lower ends of swinging arms 40. These arms are mounted intermediately upon pivots 41 secured to the links 24. respectively, as shown in Figs. 4, 5 and 9. The arrangement of these parts is such that when the car bed is in its normal position and the plungers are retracted, the hooks 39 will lie under the pins 38, but will be disconnected therefrom, as shown in Fig. 5. When the plunger 19 is projected, the links 24 will be swung upward carrying the arms 40 with them, whereupon the hooks 39 will engage the pins 38 and rock the arms 37 upward, as shown in Fig. 6, thus rocking the rock-shaft 36. This rocking of the rock-shaft operates to release certain locking devices hereinafter described by which the car bed is prevented from tilting. 42 indicates arms carried by the rock-shaft 36 adjacent to the ends of the car, each of said arms being connected by a link 43 with a lever 44. Each of said levers is provided with a hook 45 at its lower end, as shown in Fig. 2, and is pivotally mounted at 46 on the under body of the car. 47 indicates a pivot connecting the link 43 with the arm 42; and 48 indicates a pivot connecting said link with the lever 44. 49 indicates a lug at the back of the hook 45. The hook 45 is adapted to engage the inner end 50 of a lever 51 mounted upon a pivot 52 near the side of the car body, as shown in Figs. 1 and 2. The lever 51 is so shaped that its weight will normally swing the portion 50 thereof toward the center of the car, the opposite end of said lever swinging downward and outward into the position shown in Fig. 1. The outer end of said lever is connected by a chain 53, or other flexible connection, with the side of the car bed. The length of this chain is such that when the car bed and lever 51 are respectively in their normal positions the chain 53 will be substantially taut. At this time the inner end 50 of the lever 51 will be in engagement with the hook 45. The corresponding position of the parts at the opposite side of the car is shown at the right in Fig. 2. It will be apparent from the foregoing description that when the rock-shaft 36 is rocked by the projection of the plunger 19, the arms 42 at the ends of said rock-shaft, by their upward movement, will swing the hooked levers 44 at that side of the car about their pivots 46 so as to move them out of engagement with the two locking levers 51 at that side of the car, this operation being indicated in part by dotted lines at the left in Fig. 1. This leaves the locking lever 51 free to swing to the position shown at the left in Fig. 2, and consequently the car bed may tilt as therein illustrated. The corresponding parts at the opposite side of the car are of course not affected, as the rock-shaft $36^a$ is not rocked, and consequently the right-hand side of the car remains locked. As it is necessary that the locking devices at the right-hand side shall remain operative during the restoration of the car bed to its horizontal position by the projection of the plunger $19^a$, it is of course necessary that the hooks $39^a$ be temporarily moved out of position to engage the arms $37^a$, and this is effected by the pivot $28^a$, the ends of which project far enough beyond the sides of the thrust-bar so as to be adapted to engage the upper ends of the arms $40^a$ and move the hooks $39^a$ out of position to engage the pins $38^a$, at the end of the dumping operation, as shown in Fig. 9. It follows that when the parts are in the position shown in said figure, when the plunger $19^a$ is projected to restore the car bed to its horizontal position, the hooks $39^a$ will be idle and will not operate the arms $37^a$, and consequently the locking devices at the right-hand side of the car will remain operative to prevent the bed from being moved beyond its horizontal position. As the car bed is righted, the thrust-bar at the high side thereof will move downward until its head 32 again engages the cross-head 21, and consequently the plunger 19 may be used to cushion the bed during its righting movement by allowing the fluid therein to exhaust more or less slowly. While the plunger 19 is descending the arms 40 will be carried downward by the link 24, permitting the arms 37 to descend and thereby restoring the hooked lever 44 to its operative position. As the high side of the car bed descends from the position shown in Fig. 2, the locking lever 51 will swing by gravity in a counter clockwise direction to its normal or locking position, shown at the right in Fig. 2, its inner end 50 moving up into engagement with the lug 49 by which it is guided into engagement with the hook 45, which then occupies a position corresponding with that of the hook $45^a$ illustrated at the right in Fig. 2.

All the parts perform their several functions automatically when power is applied to project either plunger either to dump the car or to right it.

I wish it to be understood that my invention is not limited to the specific construction shown and described, except in so far as it is particularly claimed.

That which I claim as my invention, and desire to secure by Letters Patent, is,—

1. In a dump-car, the combination with a suitable support and a bed adapted to tilt to discharge its load, of a thrust-bar pivotally connected with the car at one side of the axis thereof and depending therefrom, and laterally movable power-operated means mounted on said support and normally disconnected from said thrust-bar, said power-operated means being adapted to operatively engage the lower end portion of said thrust-bar for tilting the car to dump the same.

2. In a dump-car, the combination with a suitable support and a bed adapted to tilt to discharge its load at either side of said support, of a folding thrust-bar comprising members movable into and out of longitudinal alinement with each other, one of said members operatively engaging the car bed at one side of the axis thereof, and power-operated means adapted to engage the other member while said members are alined, to move the same endwise for tilting the car bed.

3. In a dump-car, the combination with a suitable support and a bed adapted to tilt to discharge its load at either side of said support, of a folding thrust-bar comprising jointed members movable into and out of longitudinal alinement with each other, one of said members being pivotally connected with the car bed at one side of the axis thereof, and power-operated means adapted to engage the other member while said members are alined, to move the same endwise for tilting the car bed.

4. In a dump-car, the combination with a suitable support and a bed adapted to tilt to discharge its load at either side of said support, of a folding thrust-bar comprising jointed members movable into and out of longitudinal alinement with each other, one of said members being pivotally connected with the car bed at one side of the axis thereof, power-operated means adapted to engage the other member while said members are alined, to move the same endwise for tilting the car bed, and means for guiding said thrust-bar.

5. In a dump-car, the combination with a suitable support and a bed adapted to tilt to discharge its load at either side of said support, of a folding thrust-bar comprising jointed members, one of said members being pivotally connected with the car bed at one side of the axis thereof, power-operated means adapted to engage the other member while said members are alined, to move the same endwise for tilting the car bed, and a link pivoted to said support and connected with said thrust-bar for guiding the same.

6. In a dump-car, the combination with a suitable support and a bed adapted to tilt to discharge its load at either side of said support, of a folding thrust-bar comprising jointed members, one of said members being pivotally connected with the car bed at one side of the axis thereof, power-operated means adapted to engage the other member while said members are alined, to move the same endwise for tilting the car bed, and a link pivoted to said support and connected with the lower member of the thrust-bar for guiding the same.

7. In a dump-car, the combination with a suitable support and a bed adapted to tilt to discharge its load at either side of said support, of a folding thrust-bar comprising jointed members, one of said members operatively engaging the car bed at one side of the axis thereof, and a swinging plunger-rod adapted to engage the other member while said members are alined, to move the same endwise for tilting the car bed.

8. In a dump-car, the combination with a suitable support and a bed adapted to tilt to discharge its load at either side of said support, of a folding thrust-bar comprising jointed members, one of said members operatively engaging the car bed at one side of the axis thereof, a swinging plunger-rod adapted to engage the other member while said members are alined, to move the same endwise for tilting the car bed, and means for guiding said plunger-rod.

9. In a dump-car, the combination with a suitable support and a bed adapted to tilt to discharge its load at either side of said support, of a folding thrust-bar comprising jointed members, one of said members operatively engaging the car bed at one side of the axis thereof, a swinging plunger-rod adapted to engage the other member while said members are alined, to move the same endwise for tilting the car bed, and a swinging link pivoted to said support and connected with said plunger-rod for guiding the same.

10. In a dump-car, the combination with a suitable support and a bed adapted to tilt to discharge its load at either side of said support, of a folding thrust-bar comprising jointed members, one of said members being pivotally connected with the car bed at one side of the axis thereof, the other member having a head provided with a bearing, and a swinging plunger-rod adapted to engage said bearing to move said thrust-bar endwise.

11. In a dump-car, the combination with a suitable support and a bed adapted to tilt to discharge its load at either side of said support, of a folding thrust-bar comprising jointed members, one of said members being pivotally connected with the car bed at one side of the axis thereof, the other member having a head provided with a bearing, a swinging plunger-rod adapted to engage said bearing to move said thrust-bar endwise, and a link for guiding said plunger-rod.

12. In a dump-car, the combination with a suitable support and a bed adapted to tilt to discharge its load at either side of said support, of a folding thrust-bar comprising jointed members, one of said members being pivotally connected with the car bed at one side of the axis thereof, the other member having a head provided with a bearing, a swinging plunger-rod adapted to engage said bearing to move said thrust-bar endwise, a link for guiding said plunger-rod, and means for guiding said thrust-bar.

13. In a dump-car, the combination with a suitable support and a bed adapted to tilt to discharge its load at either side of said support, of a folding thrust-bar at each side of the bed, each of said thrust-bars comprising jointed members movable into and out of longitudinal alinement with each other, one of said members being pivoted to the car bed at one side of the axis thereof, and power-operated devices at opposite sides of the car adapted to engage said thrust-bars to tilt the bed, and arranged to fold the thrust-bar at the side of the bed which is lowermost when the car-bed is tilted in either direction.

14. In a dump-car, the combination with a suitable support and a bed adapted to tilt to discharge its load at either side of said support, of a folding thrust-bar at each side of the bed, each of said thrust-bars comprising jointed members movable into and out of longitudinal alinement with each other, one of said members being pivoted to the car bed at one side of the axis thereof, and plunger-rods at opposite sides of the car adapted when operated to tilt the bed to engage the appropriate thrust-bar and move it endwise with the members thereof in alinement, and operating when in their normal position to cause the appropriate thrust-bar to fold when the car-bed is tilted.

15. In a dump-car, the combination with a suitable support and a bed adapted to tilt to discharge its load at either side of said support, of folding thrust-bars at opposite sides of the car, said thrust-bars being composed of jointed members, the upper members of said thrust-bars being connected to the car bed at opposite sides of the axis thereof, and plunger-rods at opposite sides of the car movable into engagement with the lower members of said thrust-bars respectively, said plunger-rods being movable laterally with reference to the lower members of said thrust-bars, whereby said plunger-rods will act upon said thrust-bars either in a line falling at one side of the hinge thereof or on the opposite side in a direction tending to fold the members thereof depending upon whether said plunger rods are acting to dump the car bed or to restore it to normal position.

16. In a dump-car, the combination with a suitable support and a bed adapted to tilt to discharge its load at either side of said support, of folding thrust-bars at opposite sides of the car, said thrust-bars being composed of jointed members, the upper members of said thrust-bars being connected to the car bed at opposite sides of the axis thereof, plunger-rods at opposite sides of the car movable into engagement with the lower members of said thrust-bars respectively, said plunger-rods being movable laterally with reference to the lower members of said thrust-bars, whereby said plunger-rods will act upon said thrust-bars either in a line falling at one side of the hinge thereof or on the opposite side in a direction tending to fold the members thereof depending upon whether said plunger rods are acting to dump the car bed or to restore it to normal position, and means for guiding said plunger-rods.

17. In a dump-car, the combination with a suitable support and a bed adapted to tilt to discharge its load at either side of said support, of folding thrust-bars at opposite sides of the car, said thrust-bars being composed of jointed members, the upper members of said thrust-bars being connected to the car bed at opposite sides of the axis thereof, plunger-rods at opposite sides of the car movable into engagement with the lower members of said thrust-bars respectively, said plunger-rods being movable laterally with reference to the lower members of said thrust-bars, whereby said plunger-rods will act upon said thrust-bars either in a line falling at one side of the hinge thereof or on the opposite side in a direction tending to fold the members thereof depending upon whether said plunger rods are acting to dump the car bed or to restore it to normal position, means for guiding said plunger-rods, and means for guiding said thrust-bars.

18. In a dump-car, the combination with a suitable support and a bed adapted to tilt to discharge its load at either side of said support, of a folding thrust-bar comprising jointed members, one of said members operatively engaging the car bed at one side of the axis thereof, power-operated means adapted to engage the other member while said members are alined, to move the same endwise for tilting the car bed, means for locking the bed in its normal position, and mechanism operated by said power-operated means for releasing the car bed to permit it to be tilted.

19. In a dump-car, the combination with a suitable support and a bed adapted to tilt to discharge its load at either side of said support, of a folding thrust-bar comprising jointed members, one of said members operatively engaging the car bed at one side of the axis thereof, power-operated means adapted to engage the other member while said members are alined, to move the same endwise for tilting the car bed, locking means at opposite sides of the car, for holding the bed in its normal position, and mechanism operated by said power-operated means for releasing the locking means at the side of the bed to be elevated in tilting the same.

20. In a dump-car, the combination with a suitable support and a bed adapted to tilt to discharge its load, of a cylindrical plunger open at its upper end, a swinging plunger-rod operating in said plunger, means operated by said plunger-rod for tilting the bed, and a cover for said plunger.

21. In a dump-car, the combination with a suitable support and a bed adapted to tilt to discharge its load, of a cylindrical plunger open at its upper end, a laterally-swinging plunger-rod operating in said plunger, means operated by said plunger-rod for tilting the bed, and a transversely-sliding cover for said plunger.

22. A dump-car, comprising a suitable support, a bed mounted upon said support and adapted to tilt to discharge its load, a locking lever fulcrumed upon said support between its ends, means constantly connecting one end portion of said lever with the car bed at one side of the fulcrum thereof, and locking means adapted to engage said locking lever at the opposite side of the fulcrum thereof for locking the bed in its normal position.

23. A dump-car, comprising a suitable support, a bed mounted upon said support and adapted to tilt to discharge its load, a locking lever fulcrumed upon said support between its ends, means constantly connecting one end portion of said lever with the car bed at one side of the fulcrum thereof, locking means adapted to engage said locking lever at the opposite side of the fulcrum thereof for locking the bed in its normal position, and power-operated means for releasing said locking lever.

24. A dump-car, comprising a suitable support, a bed mounted upon said support and adapted to tilt to discharge its load, a locking lever fulcrumed upon said support between its ends, means constantly connecting one end portion of said lever with the car bed at one side of the fulcrum thereof, and locking means adapted to engage said locking lever at the opposite side of the fulcrum thereof for locking the bed in its normal position, said locking lever being arranged to return to its locking position by gravity.

25. A dump-car, comprising a suitable support, a bed mounted upon said support and adapted to tilt to discharge its load, a locking lever fulcrumed upon said support between its ends, means constantly connecting one end portion of said lever with the car bed at one side of the fulcrum thereof, locking means adapted to engage said locking lever at the opposite side of the fulcrum thereof for locking the bed in its normal position, and power-operated means for releasing said locking lever, said locking lever being arranged to return to its locking position by gravity.

26. A dump-car, comprising a suitable support, a bed mounted upon said support and adapted to tilt to discharge its load, a locking lever fulcrumed upon said support between its ends, means constantly connecting one end portion of said lever with the car bed at one side of the fulcrum thereof, and a latch mounted on said support and engaging said locking lever at the opposite side of the fulcrum thereof for holding the same in operative position, said locking lever being arranged to return to its locking position by gravity.

27. A dump-car, comprising a suitable support, a bed mounted upon said support and adapted to tilt to discharge its load, a locking lever fulcrumed upon said support between its ends, means constantly connecting one end portion of said lever with the car bed at one side of the fulcrum thereof, a latch mounted on said support and engaging said locking lever at the opposite side of the fulcrum thereof for holding the same in operative position, and power-operated means for releasing said locking lever, said locking lever being arranged to return to its locking position by gravity.

28. A dump-car, comprising a suitable support, a bed mounted upon said support and arranged to tilt to discharge its load, a locking lever fulcrumed between its ends upon said support and disposed transversely thereof, means constantly connecting the outer end portion of said lever with the bed at one side of the axis thereof, and means mounted on said support and engaging the inner end portion of said lever for locking the same in operative position.

29. A dump-car, comprising a suitable support, a bed mounted upon said support and arranged to tilt to discharge its load, a locking lever fulcrumed between its ends upon said support and disposed transversely thereof, means constantly connecting the outer end portion of said lever with the bed at one side of the axis thereof, and means mounted on said support and engaging the inner end portion of said lever for locking the same in operative position, the outer end portion of said lever being heavier than the inner end portion thereof, whereby it will return by gravity to its normal position.

30. A dump-car, comprising a suitable support, a car bed mounted thereon and adapted to tilt in opposite directions to discharge its load, a folding thrust-bar depending from the car bed at one side of the axis thereof and adapted to move transversely of the axis of the car bed out of the way to permit the car bed to be tilted toward one side, and power-operated means coöperating with said thrust-bar to tilt the car bed toward the opposite side.

31. A dump-car, comprising a suitable support, a car bed mounted thereon and adapted to tilt in opposite directions to discharge its load, power-operated means mounted on said support for tilting the car bed, and a thrust-bar carried by said bed and coöperating with said power-operated means, said thrust-bar comprising a plurality of members movable laterally with relation to the axis of the car bed into or out of operative position.

32. A dump-car, comprising a suitable support, a car bed mounted thereon and adapted to tilt in opposite directions to discharge its load, power-operated means mounted on said support for tilting the car bed, and a thrust-bar carried by said bed and coöperating with said power-operated means, said thrust-bar comprising members movable laterally with relation to the axis of the car bed into or out of longitudinal alinement with each other.

33. A dump-car, comprising a suitable support, a car bed mounted thereon and adapted to tilt in opposite directions to discharge its load, power-operated means mounted on said support for tilting the car bed, and a thrust-bar carried by said bed and coöperating with said power-operated means, said thrust-bar comprising members connected together by a knuckle joint and movable into or out of longitudinal alinement with each other.

34. A dump-car, comprising a suitable support, a car bed mounted thereon and adapted to tilt in opposite directions to discharge its load, power-operated means mounted on said support for tilting the car bed, and a thrust-bar carried by said bed and coöperating with said power-operated means, said thrust-bar comprising members connected together by a knuckle joint and movable laterally with relation to the axis of the car bed into or out of longitudinal alinement with each other.

35. In a dump-car, the combination with a suitable support and a bed adapted to tilt to discharge its load at either side of said support, of a folding thrust-bar comprising members movable into or out of longitudinal alinement with each other, one of said members operatively engaging the car bed at one side of the axis thereof, and a swinging plunger rod adapted to engage the other member while said members are alined to move the same endwise for tilting the car bed.

36. In a dump-car, the combination with a suitable support and a bed adapted to tilt to discharge its load at either side of said support, of a folding thrust-bar comprising members movable into or out of longitudinal alinement with each other, one of said members operatively engaging the car bed at one side of the axis thereof, a swinging plunger rod adapted to engage the other member while said members are alined to move the same endwise for tilting the car bed, and means for guiding said plunger rod.

JAY BYRON RHODES.